US008186308B1

(12) United States Patent
Hluben et al.

(10) Patent No.: US 8,186,308 B1
(45) Date of Patent: May 29, 2012

(54) PET WASHING RESTRAINT

(75) Inventors: Juraj Hluben, Boca Raton, FL (US); Russell G. Moore, Sarasota, FL (US); Lisa M. Fitzgerald, Sarasota, FL (US)

(73) Assignee: Pet Wash Inc., Sarasota, FL (US)

( * ) Notice: Subject to any disclaimer, the term of this patent is extended or adjusted under 35 U.S.C. 154(b) by 92 days.

(21) Appl. No.: 12/766,585

(22) Filed: Apr. 23, 2010

(51) Int. Cl.
*A01K 13/00* (2006.01)
*A01K 3/00* (2006.01)

(52) U.S. Cl. .......................... 119/676; 119/856; 119/795

(58) Field of Classification Search .................. 119/673, 119/676, 856, 863, 795; 116/63 C; 248/205.5–206.4
See application file for complete search history.

(56) References Cited

U.S. PATENT DOCUMENTS

| | | | | |
|---|---|---|---|---|
| 2,438,979 A | * | 4/1948 | Short | 119/751 |
| 2,491,951 A | * | 12/1949 | Buettner et al. | 119/799 |
| 3,266,464 A | | 8/1966 | Davis | |
| 4,041,905 A | | 8/1977 | Prager et al. | |
| 4,696,447 A | * | 9/1987 | Strecker | 248/206.3 |
| 5,243,931 A | * | 9/1993 | McDonough | 119/671 |
| 5,287,822 A | * | 2/1994 | Anderson | 116/63 P |
| 5,373,814 A | * | 12/1994 | Seymour | 119/795 |
| 5,749,325 A | | 5/1998 | Albanese | |
| 5,829,392 A | * | 11/1998 | Coleman | 119/795 |
| 5,870,974 A | * | 2/1999 | Johnson | 119/786 |
| 5,960,746 A | | 10/1999 | Salts | |
| 6,578,528 B1 | * | 6/2003 | Brown | 119/769 |
| 6,988,467 B1 | * | 1/2006 | Smith | 119/675 |
| 7,219,625 B2 | | 5/2007 | Powers | |
| D573,315 S | | 7/2008 | Kelley et al. | |

* cited by examiner

*Primary Examiner* — Rob Swiatek
*Assistant Examiner* — Kathleen Iwasaki
(74) *Attorney, Agent, or Firm* — Charles J. Prescott

(57) ABSTRACT

A pet washing restraint including hollow support member, preferably having a pyramid-like shape and also having a base end and a distal end, the support member tapering from the base end. Spaced apart suction members are connected to, and face away from, the base end and are adapted for releasable attachment to an upright wall surface of a bathing tub. A pet torso-engaging strap is attached to, and extends from the distal end for engagement around a torso of the pet. The support member is sized in length to position and restrain the pet held within the strap encircling the torso of the pet from substantial movement centrally within the bathing tub. A second restraint acting together in side-by-side fashion may also be provided for enhanced pet movement control.

3 Claims, 5 Drawing Sheets

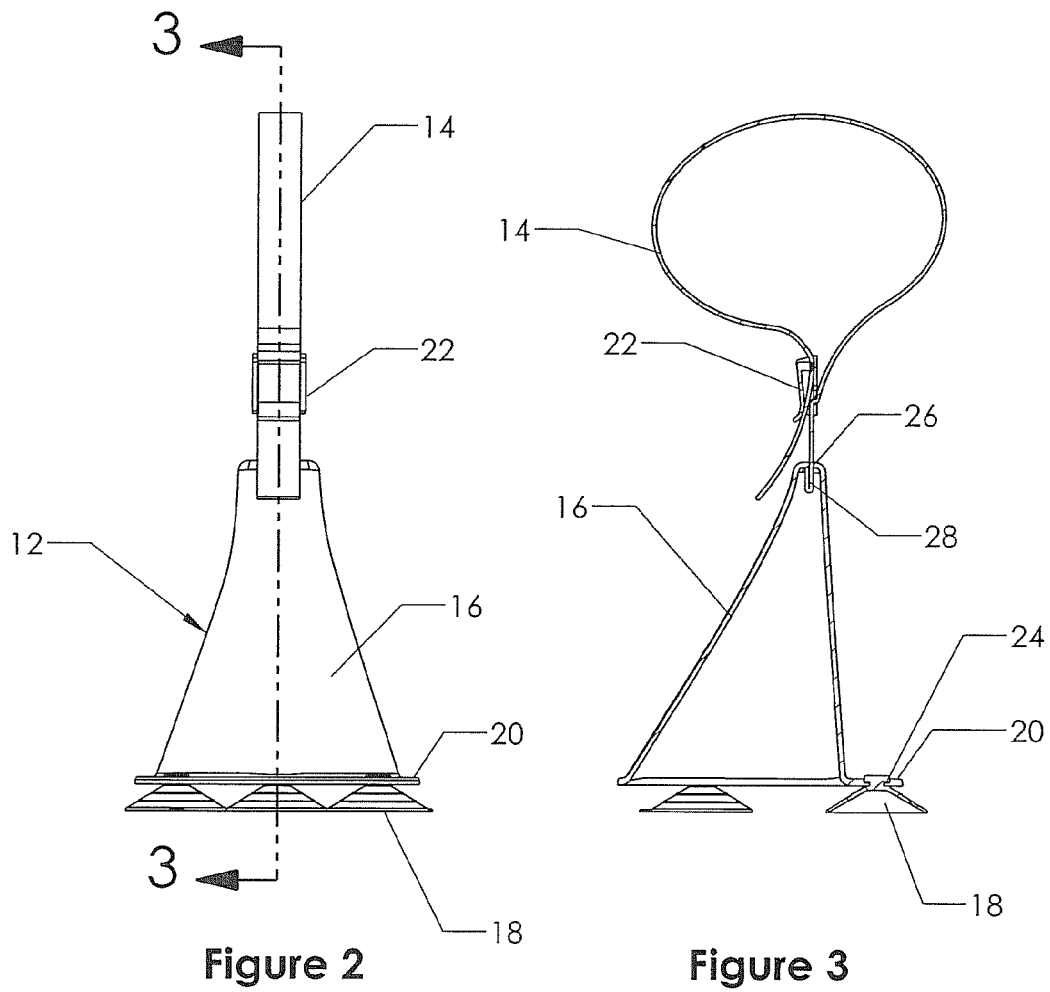
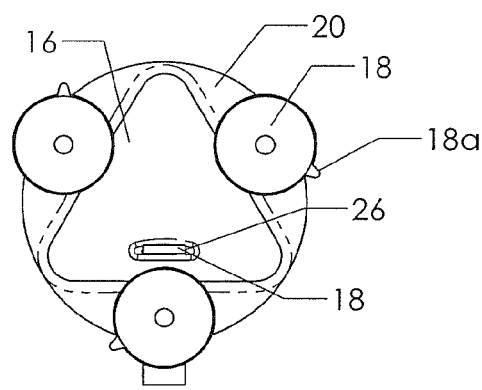

PET WASHING RESTRAINT

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to pet accessory devices, and more particularly to a pet restraint for positioning and holding a pet within a bathing tub during bathing and grooming activities.

2. Description of Related Art

A number of prior art devices are dedicated to grooming activities of animals, and in particular pets such as cats and dogs. All of these devices appear to be intended to restrain body movement as most pets are not likely to enjoy the bathing and grooming process, particularly within a bathtub, better suited for confining the mess of pet bathing to a easily cleanable area after bathing activities.

U.S. Pat. No. 5,960,746 to Salts discloses a rigid dog grooming restraint used to secure dogs in a stationary position atop a table while performing grooming operations. Albanese teaches a multi-purpose restraining strap used as a general purpose leash and a washing restraint for pets in U.S. Pat. No. 5,749,325. A height adjustable grooming tether device is disclosed in U.S. Pat. No. 3,266,464 to Davis.

Powers teaches an apparatus and a method for restraining, washing or grooming an animal atop a container lid having numerous drainage holes in U.S. Pat. No. 7,219,625. An animal grooming tethering device is taught by Prager et al. in U.S. Pat. No. 4,041,905.

The present invention provides an easily deployable suction engaging pet restraint device used singly or in pairs which positions and restrains the pet centrally within a bathtub for easy bathing and grooming activities.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to a pet washing restraint including hollow support member, preferably having a pyramid-like shape and also having a base end and a distal end, the support member tapering from the base end. Spaced apart suction members are connected to, and face away from, the base end and are adapted for releasable attachment to an upright wall surface of a bathing tub. A pet torso-engaging strap is attached to, and extends from the distal end for engagement around a torso of the pet. The support member is sized in length to position and restrain the pet held within the strap encircling the torso of the pet from substantial movement centrally within the bathing tub. A second restraint acting together in side-by-side fashion may also be provided for enhanced pet movement control.

It is therefore an object of this invention to provide a pet washing restraint which is portable, easily storable and ready for use during normal grooming and bathing activity within a bathing tub setting.

It is yet another object of this invention to provide a pet washing restraint which is easily deployable against an upright wall of a bathing tub and is easily securable around the torso of the pet for bathing and grooming activities within the bathing tub.

Still another object of this invention is to provide a pet bathing restraint which is easy to manufacture and rinse and clean after bathing activities have been completed.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

FIG. 2 is a side elevation view of one of the restraints of FIG. 1.

FIG. 3 is a section view in the direction of arrows 3-3 in FIG. 2.

FIG. 4 is a bottom plan view of FIG. 2.

Figure 1:
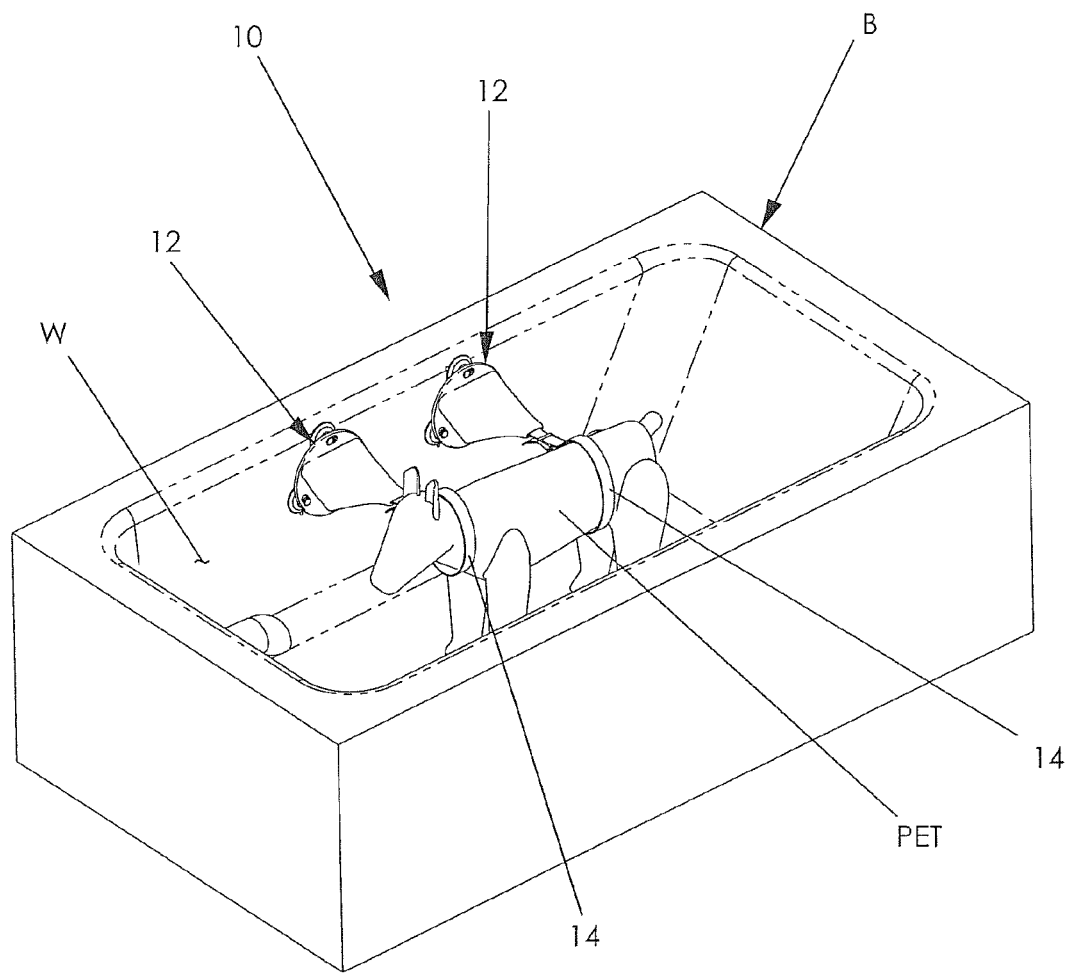
FIG. 1 is a perspective view of the system of the invention temporarily attached to an upright wall of a bathing tub with the pet positioned and restrained centrally within the bathing tub.
Figure 5:
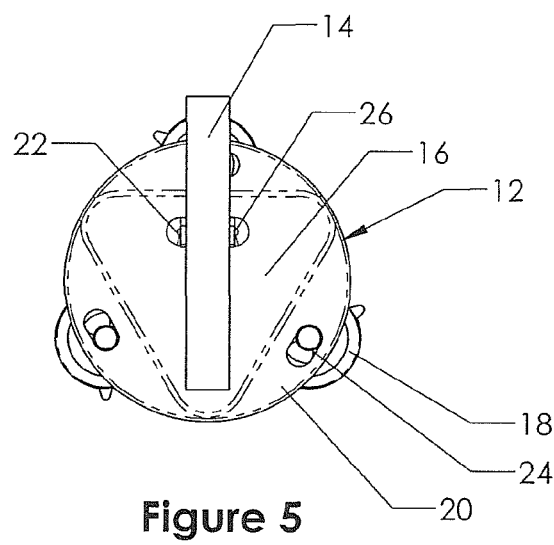
FIG. 5 is a top plan view of FIG. 2.
Figure 6:
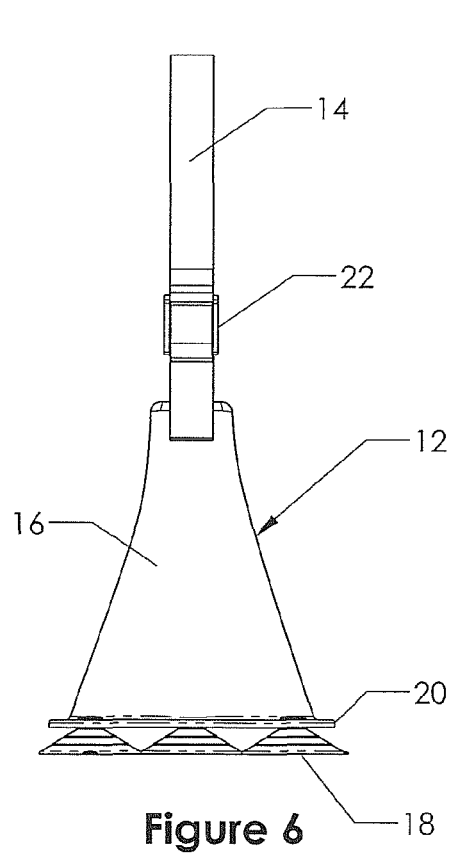
FIG. 6 is a rear elevation view of FIG. 2.
Figure 7:
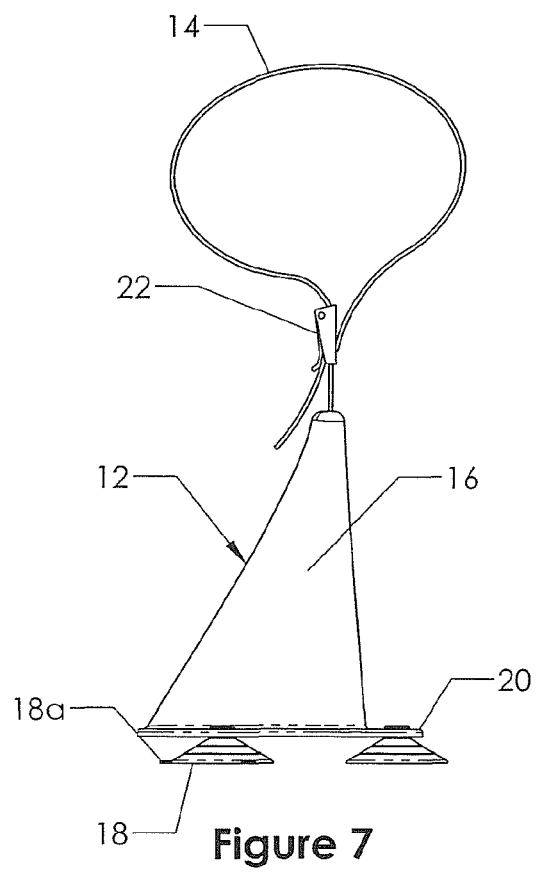
FIG. 7 is a side elevation view of FIG. 6.
Figure 8:
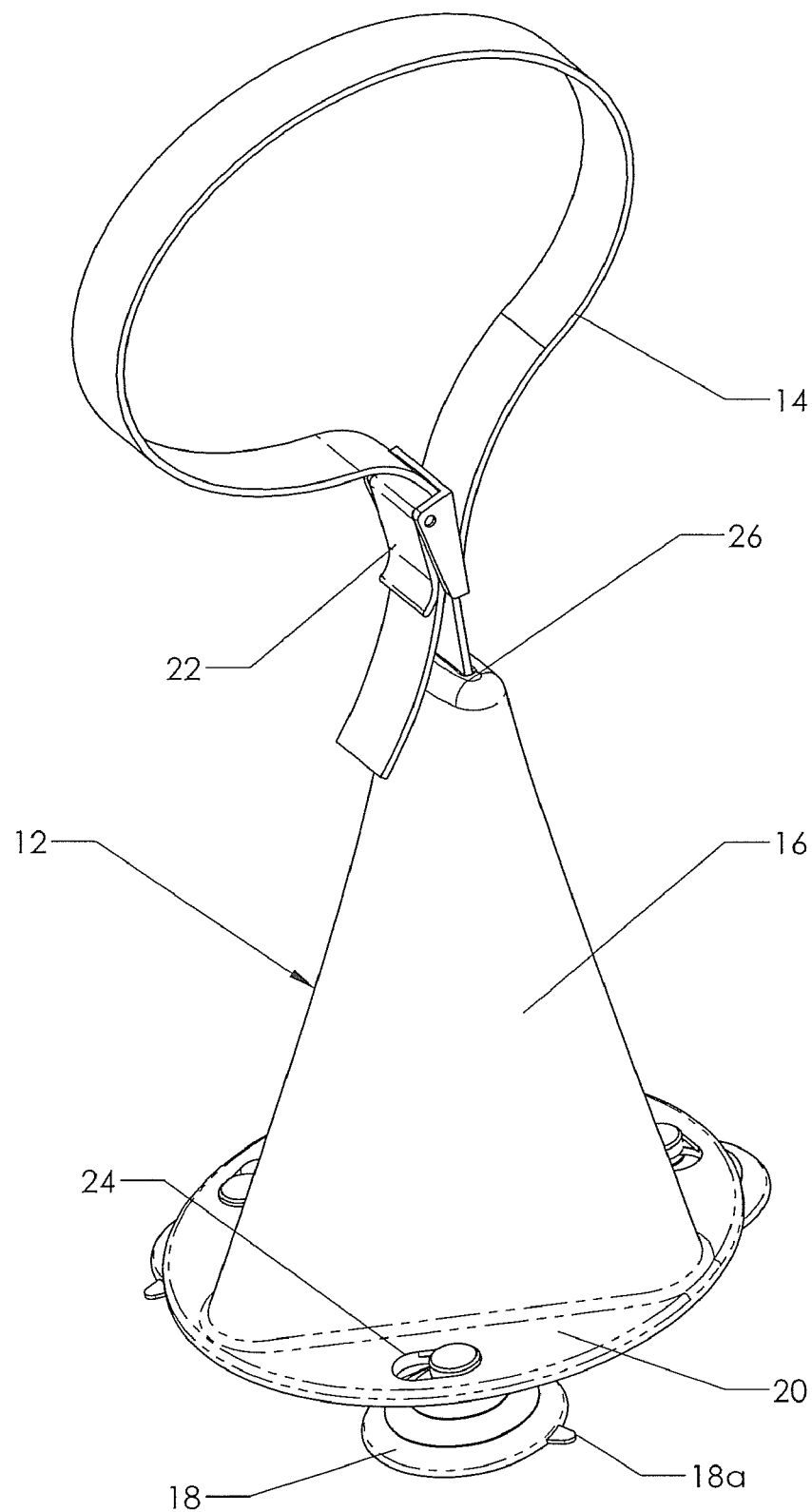
FIG. 8 is a perspective view of FIG. 6.
Figure 9:
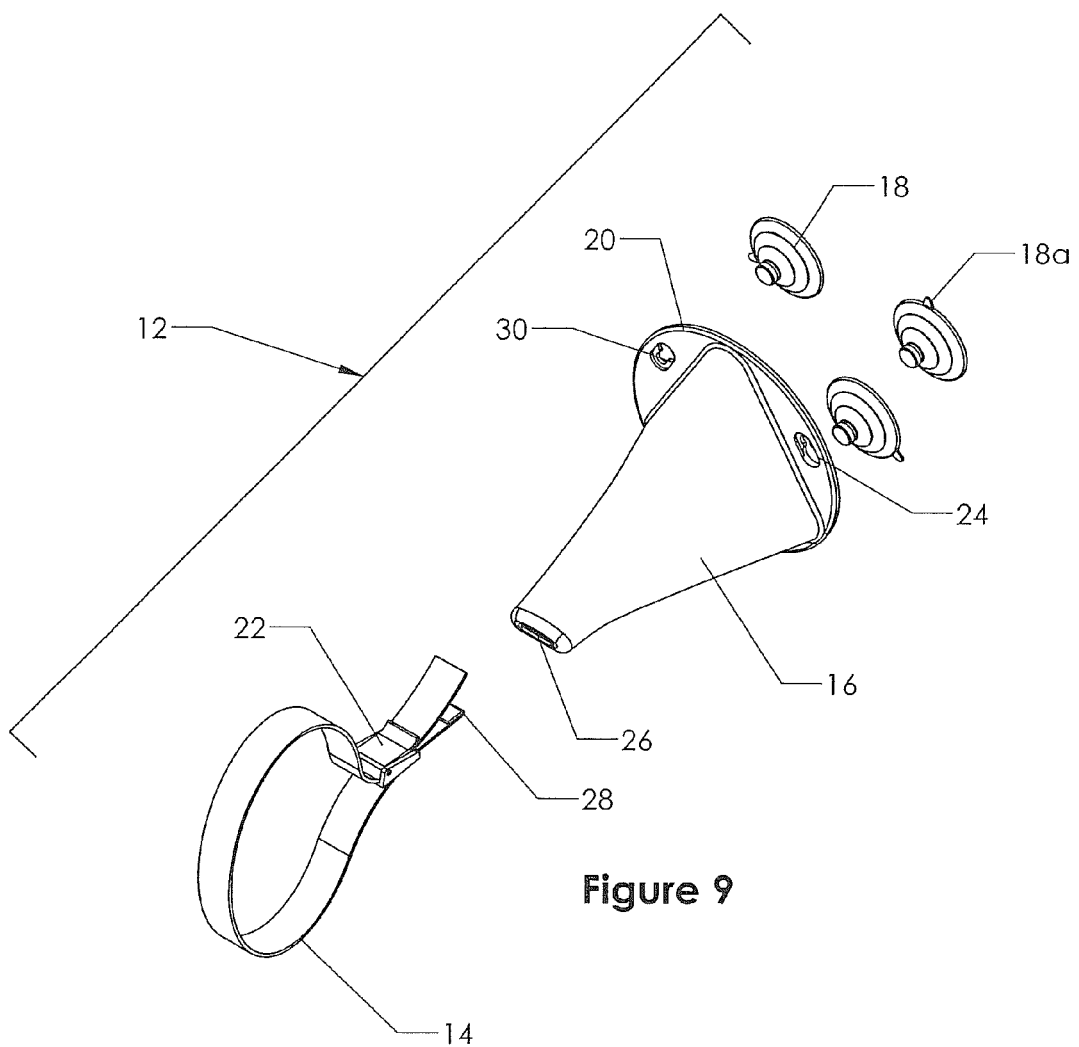
FIG. 9 is an exploded perspective view of FIG. 8.

Exemplary embodiments are illustrated in reference figures of the drawings. It is intended that the embodiments and figures disclosed herein are to be considered to be illustrative rather than limiting.

DETAILED DESCRIPTION OF THE INVENTION

| | Component Description |
|---|---|
| 10 | pet washing restraint |
| 12 | restraint |
| 14 | strap |
| 16 | support member |
| 18 | suction cup |
| 18a | suction cup release tab |
| 20 | base flange |
| 22 | strap buckle |
| 24 | suction cup retainer aperture |
| 26 | strap slot |

-continued

| | Component Description |
|---|---|
| 28 | stitched strap doubler |
| 30 | suction cup retainer detent |
| W | wall |
| B | bathing tub |

Referring now to the drawings, the preferred embodiment of the disclosure is there shown generally at numeral 10 and includes a pair of identical pet washing restraints 12 shown attached to an upright wall W of a bath or bathing tub B. Each of these pet washing restraints 12 act together to surround spaced apart torso areas of a pet within a central area of the bathing tub B. In this orientation within the bathing tub B, the pet may be easily washed and groomed without concern for any active or violent pet movement which might cause injury to the pet and facilitating all phases of washing and grooming without interference from surrounding tub environment.

Each of the pet washing restraints 12 include a substantially hollow rigid, semi-rigid or resilient support member 16 mold-formed having a generally pyramid-like shape and a hollow interior as best seen in FIGS. 3 and 4. Each of the support members 16 may be mold formed of rigid plastic material, semi-rigid polyethylene or polypropylene, or resilient molded rubber material where less control of movement of the pet being restrained during bathing and grooming activity is required. Rigid plastic material is preferred.

Each support member 16 thus defines a base end formed of laterally extending flanges 20 defining a circular base perimeter and tapering toward a distal end having a transverse strap slot 26 formed therethrough. Each of the flanges 20 includes a suction cup retainer aperture 24 and a detent 30 which affixedly and supportively receives an enlarged knob of a resilient suction cup 18. Thus, as best seen in FIG. 4, the array of three suction cups 18 are held on one corresponding flange 20 within the retainer aperture 24 and lying in a plane for suction attachment to the substantially nonporous side upright wall W of the bathing tub B. The knobs on each of the suction cups 18 are held by detent 30 to secure this interengagement. A release tab 18a quickly releases suction between the suction cup 18 and the wall W.

An elongated flexible pet torso engaging strap 14 is secured at one end thereof into strap slot 26. The proximal end of the strap 14 is doubled over and thus has a thickness greater than the width of the strap slot 26 so that, when the strap 14 is fed upwardly through the strap slot 26, the stitched strap doubler 28 prevents detachment of the strap 14 from the distal end of the support member 16.

A strap buckle 22 is provided so that, when the strap 14 is restrainingly engaged around the torso of the pet and snuggly tightened, the pet will be held in the orientation shown in FIG. 1.

By providing the hollow, smooth uniform pyramid-like thin-walled molded structure of each of the support members 16, no protrusions, sharp edges or harmful structural features are present to potentially injure either the pet or attendant should pet movement become violent or extreme. Moreover, this structure provides for easy cleanup and is simple to mold form as a single unit to reduce manufacutring costs and enhance ease of assembly. Although one pet washing restraint 12 may be sufficient for smaller pets, the preferred embodiment of the invention 10 as marketed will provide two identical restraints 12, one to be engaged around the neck portion of the pet and the other engaged around the torso in front of the hips of the pet as seen in FIG. 1.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. A pet washing restraint comprising:
a rigid or semi-rigid pyramid-like shaped substantially hollow support member having an enlarged base end and a distal end, said support member tapering from said base end to said distal end and having a smooth, uniform, thin-wall structure absent protrusions, sharp edges and harmful features;
a plurality of spaced apart suction members connected to, and facing away from said base end, the suction members adapted for releasable attachment to an upright wall surface of a bathing tub;
a pet torso-engaging strap attached to, and extending longitudinally from a slot formed into said distal end for engagement around a torso of a pet;
said support member being sized in length to position the pet held within said strap encircling the torso of the pet centrally within the bathing tub.

2. A pet washing restraint comprising:
a rigid, semi-rigid or resilient substantially hollow support member having a transverse base end and a distal end, said support member also having a pyramid-like shape tapering from said base end to said distal end;
a plurality of rigid base flanges each formed integral with said hollow support member and forming a substantially circular base perimeter of said base end;
each of said base flanges having a suction cup retainer aperture formed therethrough;
a plurality of suction cups, each suction cup of said plurality of suction cups being affixed within one said aperture;
said suction cups being oriented away from said base end and arranged lying substantially in a plane for releasable attachment against an upright wall surface of a bathing tub wherein said support member extends laterally from the wall surface;
an elongated flexible pet torso engaging strap affixed at one end thereof to said distal end and having a strap buckle forming an adjustable pet torso engaging loop with said strap;
said support member being sized in length to position a pet held within said loop encircling the torso of the pet centrally within the bathing tub.

3. A pet washing restraint comprising:
a rigid or semi-rigid substantially hollow support member molded as a unit and having a transverse base end and a distal end, said support member also having a hollow pyramid-like shape tapering from an enlarged said base end to a narrowed said distal end;
a plurality of laterally extending base flanges formed together with said hollow support member and forming said base end;
each flange of said plurality of base flanges having a suction cup retainer aperture;
a plurality of suction cups, each suction cup of said plurality of suction cups being affixed within one said aperture;
said suction cups being oriented away from said base end and arranged lying substantially in a plane for releasable attachment against an upright wall surface of a bathing tub wherein said support member extends laterally from the wall surface;

an elongated flexible pet torso engaging strap having a proximal end thereof which is doubled over and positioned within said hollow support member, said strap extending outwardly from said hollow support member through a transverse strap receiving slot formed through said distal end, said slot having a width substantially smaller than a thickness of said doubled over proximal end of said strap to affix said proximal end to said distal;

said strap including a strap buckle and forming an adjustable pet torso engaging loop;

said support member being sized in length to position a pet held within said loop encircling the torso of the pet centrally within the bathing tub.

* * * * *